(12) United States Patent
Bullis et al.

(10) Patent No.: US 9,251,339 B2
(45) Date of Patent: Feb. 2, 2016

(54) CORE DUMP PRIVACY DURING APPLICATION FAILURE

(75) Inventors: Paul K. Bullis, Roundrock, TX (US); James E. Fox, Apex, NC (US); Daniel P. Julin, New York, NY (US); Martin J. Trotter, Hants (GB)

(73) Assignee: International Business Machines Corporation, Armonk, NY (US)

( * ) Notice: Subject to any disclaimer, the term of this patent is extended or adjusted under 35 U.S.C. 154(b) by 1181 days.

(21) Appl. No.: 11/967,153

(22) Filed: Dec. 29, 2007

(65) Prior Publication Data

US 2009/0172409 A1    Jul. 2, 2009

(51) Int. Cl.
G06F 11/30    (2006.01)
G06F 21/55    (2013.01)
G06F 21/50    (2013.01)
G06F 21/62    (2013.01)

(52) U.S. Cl.
CPC ........... *G06F 21/554* (2013.01); *G06F 21/50* (2013.01); *G06F 21/62* (2013.01); *G06F 2221/2107* (2013.01)

(58) Field of Classification Search
USPC ........................................................ 713/189
See application file for complete search history.

(56) References Cited

U.S. PATENT DOCUMENTS

| 5,058,164 | A  | * | 10/1991 | Elmer et al. | 713/190 |
| 5,481,610 | A  | * | 1/1996 | Doiron et al. | 380/270 |
| 7,624,444 | B2 | * | 11/2009 | Gupta et al. | 726/23 |
| 2002/0053024 | A1 | * | 5/2002 | Hashimoto et al. | 713/168 |
| 2004/0186961 | A1 | * | 9/2004 | Kimura et al. | 711/138 |
| 2005/0050389 | A1 | * | 3/2005 | Chaurasia | 714/15 |
| 2005/0050401 | A1 | * | 3/2005 | Matsuki et al. | 714/42 |
| 2007/0006226 | A1 | * | 1/2007 | Hendel | 718/1 |
| 2007/0016803 | A1 | * | 1/2007 | Lelikov | 713/193 |
| 2007/0255912 | A1 | * | 11/2007 | Kelly et al. | 711/159 |
| 2008/0126301 | A1 | * | 5/2008 | Bank et al. | 707/3 |

* cited by examiner

*Primary Examiner* — Esther B Henderson
(74) *Attorney, Agent, or Firm* — Steve M. Greenberg, Esq.; CRGO Law

(57) ABSTRACT

Embodiments of the present invention address deficiencies of the art in respect to core dump generation during application fault handling and provide a method, system and computer program product for privacy preservation of core dump data during application fault handling. In an embodiment of the invention, a method for privacy preservation of core dump data during application fault handling can be provided. The method can include receiving a crash signal for an application and generating a core dump with object data for the application. The method further can include obfuscating the object data in the core dump and writing the core dump with obfuscated object data to a file. In this way, the privacy of the object data in the core dump can be preserved.

8 Claims, 1 Drawing Sheet

CORE DUMP PRIVACY DURING APPLICATION FAILURE

BACKGROUND OF THE INVENTION

1. Field of the Invention

The present invention relates to the field of application fault handling and more particularly to core dump file generation during application fault handling.

2. Description of the Related Art

The development and deployment of a computer program generally follows an academically defined software lifecycle. The development of an application begins with the design and functional specification of the application followed by both internal and external testing. Once testing has proven the efficacy of the application, the application can be deployed to the end user for use in the field. Subsequently, as run-time and logical errors are discovered in the application, revisions to the application can be designed, tested and deployed. Eventually, a new version of the application can be deployed replacing the originally deployed application and the lifecycle can begin anew.

Run-time errors and logical errors differ from one another. A logical error refers to program code that operates as programmed, but outside of the intent of the programmer. Logical errors oftentimes arise during the functional specification of the application, though on occasion the programmer can interject a run-time error during coding contrary to the functional specification. A run-time error, by comparison, refers to program code that disrupts the operation of the application when executed. Though fault handling has been incorporated into many modern programming languages, in many cases, a run-time error results in the cessation of execution of the operation—commonly referred to as an application fault or a "crash".

Determining the root cause of an application fault can be challenging for the software developer. In many cases, the application fault will have arisen from a multitude of environmental factors coupled with programmatic errors resulting in the perfect storm—the crash. Reproducing the application fault in order to diagnose the cause, in consequence, can be difficult without the developer knowing a priori the contributing environmental factors. To assist the developer in addressing an application fault, sophisticated operating environments provide for the generation of diagnostic artifacts in response to detecting an application fault. Though reminiscent of the venerable "Dr. Watson", in truth, core dumping routines have been in wide use decades prior to the advent of the personal computer.

Core dumping of diagnostic artifacts have been part and parcel of virtualized computing environments such as the Java™ computing environment since such environments gained wide popularity more than a decade ago. (Java is a registered trademark of Sun Microsystems, Inc. of Palo Alto, Calif., United States of America) At present, in the event of detecting an application fault requiring termination of execution of an application, the Java environment provides an interrupt signal to be intercepted by a virtual machine signal handler. Upon interception of the interrupt signal, the handler can generate a core dump or a heap dump, depending upon the configuration of the virtual machine. Thereafter, the core dump or heap dump can be passed to the operating system in which the dump can be placed in file form in the file system as a native "core file".

A core dump generally includes summary information relating to the threads of the faulted application as well as the application state itself. A heap dump, by comparison, includes the content of the application heap at the time of the application fault. For many applications, the generation of a core dump is of no concern as the primary goal remains to diagnose the root cause of the fault. Yet, in certain deployment environments, the ability for an un-trusted third party to view the content of the core dump can result in a breach of privacy. In particular, within certain industries such as the healthcare and financial services industries, this type of breach of privacy can be problematic both practically and legally.

BRIEF SUMMARY OF THE INVENTION

Embodiments of the present invention address deficiencies of the art in respect to core dump generation during application fault handling and provide a novel and non-obvious method, system and computer program product for privacy preservation of core dump data during application fault handling. In an embodiment of the invention, a method for privacy preservation of core dump data during application fault handling can be provided. The method can include receiving a crash signal for an application and generating a core dump with object data for the application. The method further can include obfuscating the object data in the core dump and writing the core dump with obfuscated object data to a file. In this way, the privacy of the object data in the core dump can be preserved.

In another embodiment of the invention, a computer data processing system can be provided to include a virtual machine configured for privacy preservation of core dump data during application fault handling. The system can include a signal handler coupled to the virtual machine and configured to generate a core dump for a faulting application in the virtual machine responsive to a crash signal. The system further can include a privacy preservation module. The module can include program code enabled to obfuscate object data in the core dump before storing the core dump in a file. In one aspect of the embodiment, the program code of the privacy preservation can be enabled to encrypt object data in the core dump permitting subsequent recovery of the object data through decryption. Alternatively, in another aspect of the embodiment, the program code of the privacy preservation can be enabled to modify object data in the core dump to render the object data subsequently irretrievable.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for privacy preservation of core dump data during application fault handling. In accordance with an embodiment of the present invention, the object data captured during a core dump can be obfuscated before logging the core dump in a core dump file. In particular, the object data from the core dump can be symmetric key encrypted utilizing a key for subsequent decryption from the core dump file. Alternatively, the object data from the core dump can be modified to prevent subsequent recovery of the underlying object data.

Figure 1:
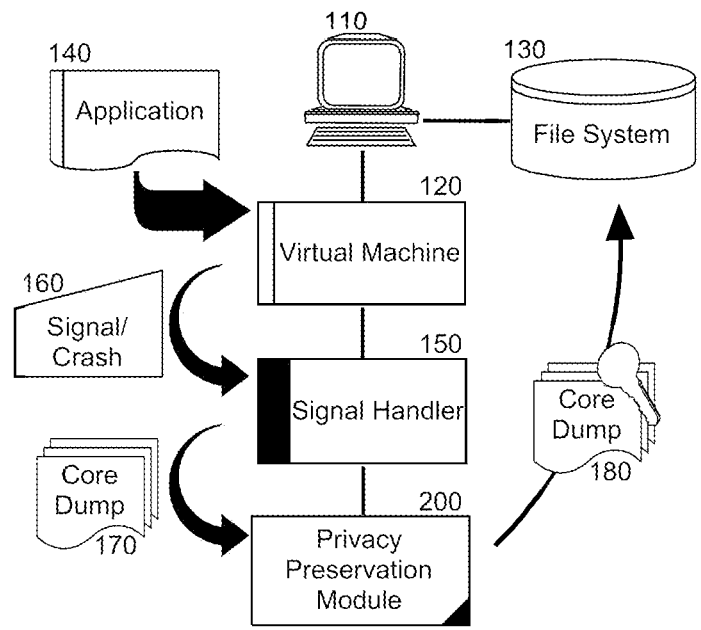
FIG. 1 is a schematic illustration of a computer data processing system configured for privacy preservation of core dump data during application fault handling; and, FIG. 2 is a flow chart illustrating a process for privacy preservation of core dump data during application fault handling.

In further illustration of an embodiment of the invention, FIG. 1 schematically depicts a computer data processing system configured for privacy preservation of core dump data during application fault handling. The system can include a host computing platform 110 supporting the operation of virtual machine 120. The virtual machine 120 in turn can manage the execution of an application 140. A file system 130 can be coupled to the host computing platform 110 into which data can be stored by application 140. Finally, a signal handler 150 can be coupled to the virtual machine 120 or provided as part of the virtual machine 120. The signal handler 150 can include a configuration to generate a core dump 170 responsive to the receipt of crash signal 160 received from the virtual machine 120 for the application 140.

Notably, a privacy preservation module 200 can be coupled to the signal handler 150 or included as part of the signal handler 150. The privacy preservation module 200 can include program code enabled to locate object data within a core dump 170 received by signal handler 150. The program code further can be enabled to obfuscate the located object to provide a modified core dump 180. In this regard, the located object can be reversibly encrypted with an encryption key such that the object data can be recovered through the use of a decryption key. Alternatively, the located object can be modified practically irreversibly so as to prevent the recovery of the located object. Finally, the program code can be enabled to store the modified core dump 180 in the file system 130.

Figure 2:
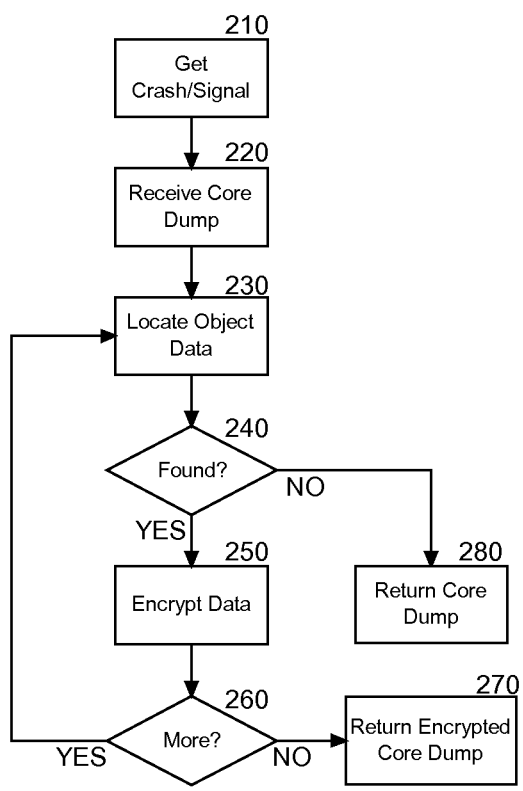

In further illustration of the operation of the privacy preservation module, FIG. 2 is a flow chart illustrating a process for privacy preservation of core dump data during application fault handling. Beginning in block 210, a crash signal indicating an application fault can be received resulting in a core dump in block 220. In block 230, the object data with the core dump can be located. In decision block 240, if object data can be located, in block 250 the object data can be obfuscated, for instance encrypted so as to permit subsequent recovery through decryption. Alternatively, the object data can be modified to practically prevent the recovery of the object. For instance the object data can be replaced with random data. In decision block 260 if additional object data can be located in the core dump the process can continue through block 230. Otherwise, the process can end in block 270 with the return of the core dump with obfuscated object data to the file system for logging. If in block 240 the object data cannot be found, the core dump is returned without encrypting or obfuscating the object data, as illustrated in block 280.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for privacy preservation of core dump data during application fault handling, the method comprising:
   receiving a crash signal for an application;
   generating a core dump with object data for the application in response to receiving the crash signal, the object data in the core dump indicating information related to different threads of the application and a state of the application;
   obfuscating the object data in the core dump before writing the core dump to a file by utilizing symmetric key encryption to encrypt the object data in the core dump using an encryption key from the core dump, the obfuscation of the object data resulting in the information related to the different threads of the application and the state of the application remaining private; and,
   writing the core dump with obfuscated object data to the file.

2. The method of claim 1, wherein receiving the crash signal for the application, comprises receiving the crash signal for the application executing in a virtual machine.

3. A computer data processing system for privacy preservation of core dump data during application fault handling, the system comprising:
   a host computing platform comprising a memory, an operating system, and also at least one processor, the operating system supporting the operation of a virtual machine;

a signal handler executing in the memory of the host computer platform and coupled to the virtual machine and configured to generate a core dump for a faulting application in the virtual machine responsive to a crash signal, the core dump including object data indicating information related to different threads of the faulting application and a state of the faulting application; and, a privacy preservation module executing in the memory of the host computer platform and comprising program code enabled to obfuscate the object data in the core dump before writing the core dump to a file by utilizing symmetric key encryption to encrypt the object data in the core dump using an encryption key from the core dump, the obfuscation of the object data resulting in the information related to the different threads of the faulting application and the state of the faulting application remaining private.

4. The system of claim 3, wherein the privacy preservation module is coupled to the signal handler.

5. The system of claim 3, wherein the privacy preservation module is included as part of the signal handler.

6. The system of claim 3, wherein the program code of the privacy preservation is enabled to subsequent recovery of the object data through decryption.

7. A computer program product comprising a non-transitory computer usable storage medium embodying computer usable program code for privacy preservation of core dump data during application fault handling, the computer program product comprising:

computer usable program code for receiving a crash signal for an application;

computer usable program code for generating a core dump with object data for the application in response to receiving the crash signal, the object data in the core dump indicating information related to different threads of the application and a state of the application;

computer usable program code for obfuscating the object data in the core dump before writing the core dump to a file by utilizing symmetric key encryption to encrypt the object data in the core dump using an encryption key from the core dump, the obfuscation of the object data resulting in the information related to the different threads of the application and the state of the application remaining private; and, computer usable program code for writing the core dump with obfuscated object data to the file.

8. The computer program product of claim 7, wherein the computer usable program code for receiving the crash signal for the application, comprises computer usable program code for receiving the crash signal for the application executing in a virtual machine.

\* \* \* \* \*